United States Patent [19]

Frayer

[11] Patent Number: 4,687,968
[45] Date of Patent: Aug. 18, 1987

[54] ENCAPSULATED ELECTROLUMINESCENT LAMP

[75] Inventor: Paul D. Frayer, Martinez, Ga.

[73] Assignee: Rogers Corporation, Rogers, Conn.

[21] Appl. No.: 765,004

[22] Filed: Aug. 12, 1985

[51] Int. Cl.$^4$ ............................................. H05B 33/04
[52] U.S. Cl. ..................................... 313/509; 313/512
[58] Field of Search ........................ 313/509, 511, 512; 427/66; 428/690, 917

[56] References Cited

U.S. PATENT DOCUMENTS

| | | | |
|---|---|---|---|
| 3,110,836 | 11/1963 | Blazek et al. | 313/108 |
| 3,110,837 | 11/1963 | Wollentin | 313/108 |
| 3,114,853 | 12/1963 | Bouchard | 313/108 |
| 3,148,299 | 9/1964 | Devol et al. | 313/108 |
| 3,161,797 | 12/1964 | Butler et al. | 313/108 |
| 3,290,535 | 12/1966 | Hirayama | 313/108 |
| 3,346,758 | 10/1967 | Dell | 313/108 |
| 3,355,347 | 11/1967 | Habermann | 161/189 |
| 3,378,715 | 4/1968 | Thornton, Jr. | 313/108 |
| 3,379,606 | 4/1968 | Bratton et al. | 161/189 |
| 3,395,058 | 7/1968 | Kennedy | 156/67 |
| 3,430,088 | 2/1969 | Beswick | 313/108 |
| 3,497,750 | 2/1970 | Knochel et al. | 313/108 |
| 3,509,401 | 4/1970 | Calley, Jr. et al. | 313/108 |
| 3,549,477 | 12/1970 | Burgman | 161/165 |
| 4,035,686 | 7/1977 | Fleming | 313/503 |
| 4,104,555 | 8/1978 | Fleming | 313/512 |
| 4,455,324 | 6/1984 | Kamijo et al. | 427/66 |
| 4,514,465 | 4/1985 | Schoenberg | 428/339 |

OTHER PUBLICATIONS

Ryder, "Oxygen-barrier Containers: Their Design and Cost", *Plastics Engineering*, 1984, pp. 41–48.
Stannett, et al., "Studied in the Gas and Vapor Permeability of Plastic Films and Coated Papers", *Tappi*, 1961, vol. 44, No. 10.
Foster, "Plastics Barrier Packaging the Future is Bright", Polymers, Laminations and Coatings Conference, 1984, pp. 437–461.
Hansen, Charles M., "Concentration Dependence, Boundary Layer Resistance, and the "Time-Lag" Diffusion Coefficient", *Polymer Engineering and Science*, (1980), vol. 20, No. 4, pp. 259–262.
Hansen, "Diffusion in Polymers", *Polymer Engineering and Science*, 1980, vol. 20, No. 4, pp. 252–258.
Keller, et al., "Gaging Moisture Vapor Permeability of Plastic Molding Compounds", *Modern Plastics*, 1979, pp. 82–86.
Schrenk, et al., "New Developments in Coextruded High Barrier Plastic Food Packaging", Polymers, Laminations and Coatings Conference, 1984, pp. 627–631.
Sible, et al., "PVdC Latex Coating of Plastic Sheet for Thermoformed Barrier Containers", Polymers, Laminations and Coatings Conference, 1984, pp. 653–658.
Baccaro, et al., "Materials and Composites for High Temperature Barrier Packaging", Polymers, Laminations and Coatings Conference, 1984, pp. 639–646.
Dagleish, "Coextruded High Barrier Films", *Coextrusion*.

*Primary Examiner*—Palmer C. DeMeo
*Assistant Examiner*—Sandra L. O'Shea

[57] ABSTRACT

A barrier for an electroluminescent lamp having a phosphor-particle-containing layer disposed between corresponding electrodes consists of an integral multilayer polymeric film. A first layer of barrier material is integrally bonded in face-to-face contact with the exposed outer surface of the lamp body and the material has a characteristic vapor transmission rate significantly below the vapor transmission rate of the material of the lamp body; a second layer of barrier material is integrally bonded in face-to-face contact with the first barrier layer and the material has a vapor transmission rate significantly greater than the vapor transmission rate of the material of the first barrier layer; and a third layer of barrier material is integrally bonded in face-to-face contact with the second barrier layer and the material has a vapor transmission rate significantly less than the vapor transmission rate of the material of the second barrier layer. The barrier layer materials are thus selected to provide alternating zones of hydrophobic and hydrophilic character, with interfacial boundaries between the layers, to restrict and delay permeation of moisture through the barrier into the lamp, the effective retardation of vapor transmission through the barrier into the lamp being greater than the sum of the retardation characteristics of the individual barrier layers.

12 Claims, 3 Drawing Figures

ENCAPSULATED ELECTROLUMINESCENT LAMP

BACKGROUND OF THE INVENTION

This invention relates generally to electroluminescent lamps and particularly to such lamps covered by a barrier to protect the active components of the lamp.

Electroluminescent lamps typically have a phosphor particle-containing layer disposed between corresponding electrodes adapted to apply an excitation potential across the phosphor layer to cause light to be emitted. At least one of the electrodes is light transmissive, or at least translucent, to allow escape of the emitted light.

Phosphors are known to deteriorate rapidly in the presence of moisture. Thus, it has been common practice to encapsulate the electroluminescent lamp within a barrier package to impair permeation of moisture into the lamp to delay deterioration of the phosphors for longer lamp life.

Typically the barrier film materials have been copolymers of poly(chlorotrifluoroethylene) (PCTFE), sold under the tradenames "ACLAR" (films), by Allied Chemical Company, and "Kel-F" (resins) by 3M Company, e.g. as taught by Blazek U.S. Pat. No. 3,110,836, Butler et al. U.S. Pat. No. 3,161,797 and Beswick U.S. Pat. No. 3,430,088. PCTFE films, as used, have significant permeability to moisture, and merely delay deterioration of the phosphors for a finite, relatively short period of time.

Increasing crystallinity, e.g. of PCTFE, is known to decrease permeability to water vapor since transport is believed to occur in the amorphous regions of polymers. Thus, the more crystalline, homopolymer PCTFE has better barrier properties than the copolymers or terpolymers. However, the more crystalline PCTFE films are also more susceptible to stress cracking and are less light transparent. Hence, in practice the less effective (more amorphous) copolymers or terpolymers are used even though it is not practical to compensate for reduced barrier properties (moisture permeation up to 100-fold higher) by increasing thickness. Fleming U.S. Pat. No. 4,104,555 sought to retard stress cracking by use of additional layers of encapsulant about the PCTFE.

It is known that diffusion coefficients increase by several orders of magnitude when the temperature is raised above the glass transition temperature ($T_g$). (Kelleher and Boyle, *Modern Plastics* Nov. 1979, p. 82.) Hence, prior art PCTFE barrier films are often inadequate, especially at temperatures above the $T_g$ of the PCTFE (e.g. 65° C.), and, at high humidities (e.g. saturated air), even at room temperature.

To compensate for the inadequate moisture barrier, others have sought to extend lamp life by inserting a separate layer of dessicant film such as nylon 6, a poly(amide) condensation product of caprolactam, between the lamp and the outer encapsulant layer, to absorb any moisture that does permeate through the encapsulant layer. Examples are Devol et al. U.S. Pat. No. 3,148,229; Dell U.S. Pat. No. 3,346,758 and Fleming U.S. Pat. No. 4,104,555, which suggest laying a dessicant layer upon the lamp surface, without bonding, within a PCTFE primary encapsulant layer.

Still another approach, Kamijo et al. U.S. Pat. No. 4,455,324, uses a vulcanized fluororubber for the lamp body to seek to provide improved moisture resistance while also using a PCTFE protective outer film.

SUMMARY OF THE INVENTION

According to the present invention, phosphor lifetime is increased with a minimum of total barrier thickness, so that lamp flexibility is not impaired, by use of an alternating sequence of hydrophobic and hydrophilic polymer films which are integrally bonded to each other and to the lamp, e.g. either thermally or by an adhesive.

Where the particular phosphors are affected substantially by water vapor, the featured sequence of hydrophobic, hydrophilic, hydrophobic layers is believed to offer considerable advantage in achieving a practical, flexible, long life electroluminescent lamp.

According to another aspect of the present invention, we believe that the presence of moisture, although necessary, may be only one contributor to phosphor life reduction. We conceive that electrochemically-active atmospheric gases such as oxygen, carbon dioxide, or common air pollutants, e.g. the oxides of sulfur and nitrogen, especially in the presence of moisture, can have a serious deleterious effect on the phosphors. Thus the prior art films have delayed phosphor deterioration for only a limited time period dependent only on the moisture permeation rate since the gas permeation rate is so high.

According to the invention a special sequence of layers, especially the preferred hydrophobic, hydrophilic, hydrophobic sequences enables the substantial exclusion of active atmospheric gases from the phosphors.

The present bonded, multilayered structure further enables the use of dyes or pigments for altering the light output of the lamp, e.g. for selectively filtering out infrared light emissions to give night vision goggle compatability or other desired light qualities.

The multilayer structure, including the layer which tailors the light output to suit the customer's needs, may be made by known procedures, including extrusion coating, or lamination with or without optional adhesive bonding, or by emulsion, dispersion coating or screen printing. The preferred arrangements of the layers within the multilayer barrier and chemical compositions of the individual films are given in the detailed description of the invention.

Other embodiments of the invention will be understood from the following description of the presently preferred embodiment, and from the claims.

PREFERRED EMBODIMENT

We first briefly describe the drawings.

DRAWINGS

The body of the electroluminescent lamp employed in the preferred embodiment to be described is made according to the copending application U.S. Ser. No.

577,145, filed Feb. 6, 1984, entitled "Electrical Circuits and Components", owned by the same assignee, and now abandoned.

The instant invention is also applicable to improving all prior art electroluminescent devices which depend on a polymeric barrier film for protection from the outside environment.

The lamp body typically includes a flexible electrode/substrate 16, selected for its electrical conductivity, flexibility, and for its ability to withstand extreme conditions of manufacture and use; a dielectric insulating layer 18; a light emitting phosphor layer 20; and semi-transparent front electrode 22.

The phosphors in the light emitting layer 20 are subject to rapid deterioration in the presence of moisture. However, we believe the possible adverse effects of electrochemically active atmospheric gases cannot be ignored. These include, e.g., oxygen, as well as carbon dioxide and common air pollutants such as the oxides of sulfur and nitrogen, which when combined with water form acidic environments. The migration of water, combined with any of the above gases, to the phosphor particles may accelerate the deterioration of their light emitting behavior, light emission and electrochemical behavior, only occurring when a potential difference is applied across the lamp electrodes.

While it is well known that a potential difference of only about 100 volts is required for excitation of the phosphors, the effective field strength at the phosphor particles within the lamp may exceed the local dielectric strength of the phosphor, e.g. on the order of $10^6$ V/cm. With such a high internal field strength, the electrochemical effects of moisture combined with common atmospheric gases which have permeated into the lamp body are believed to contribute to the loss of lamp life.

We have discovered that the life of an electroluminescent lamp is greatly extended by using a multilayer barrier which is characterized by excellent barrier properties to both moisture and atmospheric gases.

Figure 2:
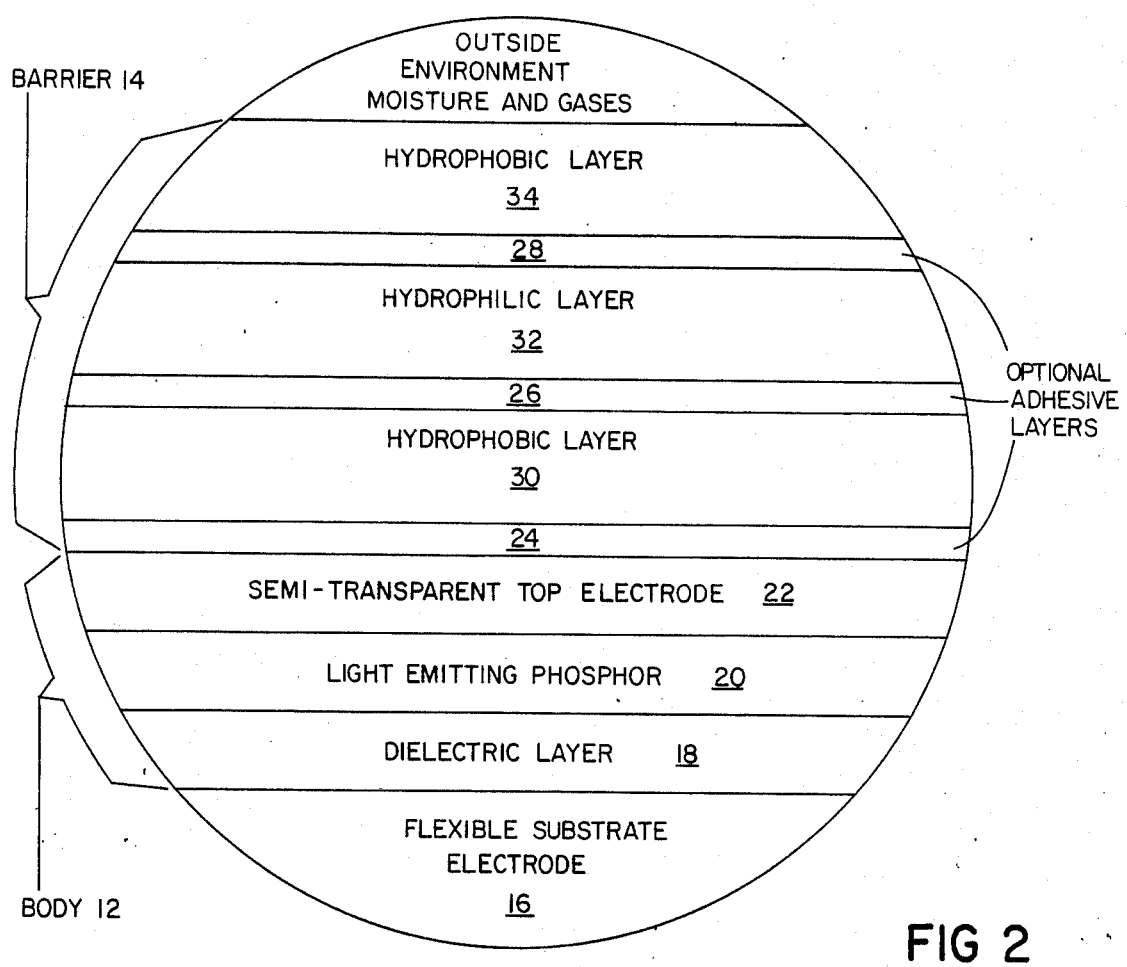
FIG. 2 is a magnified side view of a portion of the barrier and underlying lamp body indicated in FIG. 1 for the simplest example of the instant invention.

Referring to FIG. 2, the simplest case of such a multilayer barrier 14 according to the present invention is a 3-layer structure 30, 32, 34, with adhesive, or tie, layers 24, 26, 28, as desired or necessary, e.g. when two chemically different materials are to be integrally bonded. The multilayer structure can be made by any appropriate process, e.g. coextrusion, extrusion coating, etc. Standard methods of surface preparation for adhesion may also be employed, e.g., mechanical roughening, solvent cleaning, or corona discharge treatment. Inherent roughness of the lamp surface due, e.g., to the size of the phosphor particles and, to a lesser degree, the size of the indium oxide particles in the upper two layers of the lamp body, i.e. the light emitting phosphor layer 20 and the semi-transparent top electrode 22, relative to the thickness of those layers, causing the particles to protrude upwardly from the plane of the surface of the lamp body, may also contribute to adhesion.

The preferred arrangement for the multilayer structure is the alternating repetition of hydrophobic, hydrophilic, hydrophobic, etc. sequence in which as the number of layers increases, the film type (i.e. hydrophilic or hydrophobic) closest to the lamp body 12 (i.e. film layer 30 in FIG. 2) becomes less important. However, in the simplest case of a three layer barrier, with or without adhesive layers, the preferred structure is the hydrophilic layer 32 sandwiched between the two hydrophobic layers, 30 and 34.

In general, a balance of properties and cost (materials and processing) are needed for each application. Properties other than moisture and gas barrier are also important, e.g. processing, bondability, abrasion resistance, flexibility, and clarity. Thus we may choose materials to take advantage of the present invention, which do not necessarily provide for maximum performance in every case.

The following are possible reasons for the superiority of the multilayer structure of the present invention to the prior art approaches.

For any polymer film, a time lag exists before steady state diffusion begins. Also, it has been suggested that in single layer films, there exists a boundary layer resistance which in some cases makes a major contribution to the total resistance to diffusion. (Articles by Hansen and by Hansen and Skaarup, *Polymer Engineering & Science*, Vol. 20, No. 4, 1980, pp. 252 and 259, respectively.)

Relative to the present invention, we propose that increases in the number of surfaces (i.e. layers) helps to extend the lag time effect within a multilayer barrier structure. We further propose that when two or more layers are in intimate contact (i.e. integrally bonded with good adhesion by contact on the molecular level), the interface created contributes a retardation in diffusion from one material to another similar to that noted above for a single layer. (Without integral bonding, moisture, for example, could accumulate at a non-bonded interface and create a larger driving force for further diffusion into subsequent layers.)

Moisture Barrier Mechanism

Considering first moisture permeation through the basic multilayer element of the present invention, relative to moisture vapor transport, the hydrophobic, hydrophilic, hydrophobic sequence may be envisioned as two hills with an intervening valley.

The electroluminescent lamp as removed from its sealed moisture proof container, e.g. a metallized, heat-sealed polymer package used to preserve the dry state of the hydrophilic layer prior to use, has a moisture content that may be assumed to be at least close to zero, due to controlled manufacturing procedures and dessicating steps prior to packaging.

The outermost barrier layer is hydrophobic in nature and allows permeation of ambient moisture only at a low rate characteristic of the substance of the layer. Due to the dryness of the barrier layers, a period of time will pass before moisture permeates through the outermost layer to the boundary with the middle layer.

The substance forming the middle layer is highly attractive to moisture, and, once saturated, has a relatively high vapor transmission rate. However, this substance is also employed in a relatively dry state to provide a time lag in moisture transmission, i.e. a period of time will pass while the middle layer absorbs moisture to achieve saturation before moisture reaches the boundary between the middle and innermost layers to begin permeating further into the lamp.

It is also hypothesized that at the interface between the outermost (hydrophobic) layer and the middle (hydrophilic) layer, a phenomenon of boundary layer resistance, analagous to the surface boundary effect on the coefficient of heat transfer, will exist between these layers consisting of materials at the two extremes of attraction to moisture and permeation of moisture into the middle layer will be retarded. In such case, it is most preferred to provide adjacent layers at a boundary that have sharp discontinuity in water absorption characteristic to maximize to boundary layer resistance effect.

We believe that as the moisture content in the middle layer increases and as the water molecules become bound by hydrogen bonding to the hydrophilic polymer chains, the driving force decreases for additional moisture permeation from outside the outer hydrophobic layer, i.e. the concentration difference across the outer layer decreases. If the outside humidity is fluctuating between high and low levels (as often occurs in practice) or is not too high initially, the driving force for diffusion into the lamp should be even further reduced as moisture accumulates in the "valley".

In the hydrophilic middle layer, the dryness of the substance is thought to cause some of the vapor molecules permeating into the layer to become bound, and not continue to permeate toward the interface with the inner layer. The result is an initial period during which effective rate of vapor transmission through the substance of the middle layer in the lamp is somewhat below the characteristic vapor transmission rate of the substance.

After a period of time, moisture permeating through the barrier material crosses the interface between the middle (hydrophilic) layer and the innermost (hydrophobic) layer. As the level of moisture in the layer approaches saturation, the rate of transmission is again retarded by boundary effects with the material of the surface of the lamp. This also delays the time at which permeation into the lamp begins, although permeation of each layer does begin before the overlying layer is totally saturated.

Moisture permeation into the lamp continues until the presence of moisture in the phosphor layer causes the phosphors to deteriorate.

Thus according to the invention, the multilayer compound barrier provides a time lag prior to the barrier reaching solid state transmission of moisture, during which time the lamp operates at peak efficiency, and furthermore, due to other effects, provides a reduced rate of vapor transmission once solid state is achieved, to extend lamp life beyond that previously experienced.

In the prior art case of only a PCTFE barrier film, steady state diffusion is established relatively quickly, as the time lag for steady state flux is short. In the case of an added nylon 6 dessicant, the time lag is increased, but this also is relatively brief since nylons in general have relatively low water absorption capacity, especially compared to the preferred hydrophilic polymers of the present invention.

Furthermore, in the prior art case, diffusion into previously prepared lamps from the quickly saturated nylon 6 dessicant layer is unrestricted. Thus, even if the outer driving force is reduced, the inner driving force for transport into the lamp body is still high. The inner hydrophobic barrier layer of the present invention decreases that inner driving force into the lamp and may in some special situations reverse the driving force so that moisture moves in the direction of the outer hydrophobic barrier, and steady state flux into the lamp is reduced, may become zero or may even reverse direction in actual use, e.g. where the outside humidity is fluctuating.

Although the above explanation has not been fully proven, our experimental work supports the conclusion that such a multilayer structure of at least three layers produces excellent results. Although cost considerations may limit the application of the invention in some cases to 3 or 5 layers, with two hydrophilic "valleys" (adhesive layers optional), many repetitions of the alternating hydrophilic-hydrophobic sequence on top of the basic hydrophobic-hydrophilic-hydrophobic sequence may be used for high performance applications.

The practical limit on the number of layers in a multilayer barrier according to the present invention cannot be established since the light level required varies from application to application and the light emission can be varied continously by changing voltage, frequency or both. Furthermore, advances in extrusion technology are making possible the manufacture of thinner layers within multilayer films, i.e. larger numbers of layers without substantially increasing the total thickness.

Atmospheric Gas Barrier

As mentioned previously, we believe, according to the invention, that moisture barrier properties are only part of the problem of premature phosphor deterioration. We believe oxygen and oxides of carbon, nitrogen, and sulfur may further reduce lamp life when combined with moisture after diffusion into the lamp to the phosphor particles. These effects are very difficult to quantify. Nevertheless, we discovered such a pronounced improvement in electroluminescent lamp life when we employed a combined gas and moisture barrier multilayer structure, that we have concluded that the use of gas barrier layers is important.

In summary, we have found best improvement when at least one layer, and preferably more than one layer, provide(s) gas barrier properties while at least one layer, and preferably more than one layer, further provide(s) moisture barrier properties. Clearly, it is advantageous to use layers which exhibit both moisture and gas barrier properties. Such polymers exist, but the prior art type of PCTFE film, which is not an adequate gas barrier, is not among them.

Preferred Hydrophilic and Hydrophobic Layers

As noted earlier, equilibrium water absorption may be used as a guide for selecting the polymer material of the hydrophilic layer(s). For convenience, one can classify polymeric materials into three broad categories according to the weight % of moisture absorbed: less than 0.1% (sometimes defined as hydrophobic), between 0.1% and 1%, and greater than 1%.

Water absorption values do not necessarily correlate with water vapor transmission rates (WVTR), particularly where the lamp system initially is relatively dry and the hydrophilic layer is protected from moisture by the hydrophobic layer. Nevertheless, WVTR values are important in selecting the materials that are preferred based on all considerations, including gas barrier properties discussed below.

The preferred hydrophilic polymers fall into the third category of weight % moisture absorbed (above), i.e. greater than 1% moisture absorption by weight of polymer (good moisture transport retarders). But within that category we can identify several polymers with moisture absorption values in excess of 10% by weight of polymer (excellent moisture transport retarders) when placed in a saturated water vapor atmosphere at about 30° C. Table I lists polymers which may be considered examples of preferred hydrophilic polymers for use in the practice of the present invention. (All data is taken from the *Encyclopedia of Polymer Science & Technology*, Vol. 12, pp. 693–694, 1970.)

TABLE I

Example Hydrophilic Polymers For Retarding Moisture Transport

*Excellent Moisture Transport Retarders*

| | |
|---|---|
| cellophane | poly(oxyethylene methyl ether) |
| poly(vinyl alcohols) | poly(vinyl amines) |
| poly(acrylic acid) | poly(alkali metal acrylates) |
| poly(methacrylic acid) | poly(ethylene amines) |
| poly(acrylamides) | |

*Good Moisture Transport Retarders* poly(acrylonitriles)
some poly(amides) such as nylon 6 and nylon 66
substituted cellulosics (e.g. cellulose acetate)

Similarly, we can divide hydrophobic polymers into two categories: water absorption less than 0.01% by weight of polymer (excellent moisture repellers) and water absorption between about 0.01% and 0.1% by weight of polymer (good moisture repellers). Table II lists examples of preferred hydrophobic polymers.

TABLE II

Example Hydrophobic Polymers For Repelling Moisture

*Excellent Moisture Repellers* poly(olefins) such as poly(ethylenes), poly(propylenes)
fluoropolymers such as PTFE, FEP, ETFE
chloropolymers such as PVC, PVDC, and PVDC-VC copolymers
chlorofluoropolymers such as PCTFE and E-CTFE

*Good Moisture Repellers* poly(esters) such as PET and PBT
some poly(amides) such as nylon 6,10 and nylon 6,12
poly(olefin) copolymers
fluoropolymers such as PVDF, ETFE, PFA, PVF
chloropolymers such as some PVDC copolymers
ionomers
polystyrenes Moisture vapor permeation (MVP) or water vapor transmission rates (WVTR) can be found in the literature, but care must be used when comparing numbers because different sources use different units. A convenient list of MVP values was published by Kelleher and Boyle (*Modern Plastics*, November 1979, p. 82). Subdivision into excellent, good, and fair may be done by assigning values to these designations. Table III lists several examples. (Data taken from Kelleher and Boyle, *Modern Plastics*, November 1979, pp. 82–86; and from Ryder, *Plastics Engineering*, May 1984, pp. 41–48.)

TABLE III

Ranking of Preferred Polymers By MVP
($g \times 10^8$/cm/hr/mm Hg at 25° C.)

*Excellent MVP (Less Than 0.1)*

| | |
|---|---|
| PVDC & PVDC-VC copolymers | (.01) |
| cellophane | (.04) |
| FEP and ECTFE | (.04) |
| poly(p-xylylene) | (.10) |
| Other PVDC copolymers | (.10) |

*Good MVP (Less Than 1.0 But Greater Than 0.1)*

| | | | | | |
|---|---|---|---|---|---|
| OPP | (.17) | PE | (.35) | PET | (.60) |
| PCTFE | (.20) | PP | (.50) | PVDF | (.70) |
| ETFE | (.24) | PVF | (.50) | PVC | (1.0) |
| PTFE | (.30) | EVAL E | (.60)** | PBT | (1.0) |

*Fair MVP (Greater Than 1.0)*

| | | | |
|---|---|---|---|
| EVAL F | (1.7) | PS | (3.9) |
| BAREX | (2.8) | PMMA | (4.2) |
| Ionomer | (3.0) | Oriented nylon 6 | (4.7) |
| nylon 6,12 | (3.3) | Flexible PVC | (6.9) |
| nylon 66 | (3.8) | cellophane (value not available) | |

Next considering the gas barrier properties, although gas and vapor permeation is usually increased for hydrophilic polymers when significant moisture has been absorbed, the mechanism of operation of the multilayer barrier is believed to create a long time lag before equilibrium permeation of gases and water vapor can occur. By the time the equilibrium permeation and water absorption values are reached, under some conditions the electroluminescent lamp may already have begun deterioration because of the high degree of sensitivity of the phosphors to the electrochemically active chemicals (including water) when electrical power is applied to the lamp.

Where these are serious concerns, when choosing the layers to be used according to the invention, the "dry" atmosphere gas permeation values for the hydrophilic polymers may be used to rank their relative performance with the hydrophobic polymers since the hydrophilic polymers are protected from direct contact with the outside atmosphere. Tables IV and V list oxygen and carbon dioxide permeation rates, respectively, for several polymers.

TABLE IV

Ranking of Polymers As Oxygen Gas Barriers
(cu cm/mil/100 sq in/day/atm at 73° F. and 0% RH)

*Excellent Oxygen Barriers*

| | |
|---|---|
| poly(vinyl alcohols) such as EVALs | (.01) |
| poly(vinylidene chlorides) such as SARANs | (.10) |
| cellophane | (.13) |

*Good Oxygen Barriers*

| | |
|---|---|
| poly(acrylonitriles) such as BAREX | (1.1) |
| crystalline poly(chlorotrifluoroethylenes) | (3.2) |
| poly(vinylidene fluorides) such as "KYNAR" | (4.5) |
| poly(esters) such as PET and PBT | (5–10) |
| poly(amides) such as nylons 6, 66, 6,10 etc. | (6–11) |

*Fair Oxygen Barriers*

| | |
|---|---|
| poly(vinyl chlorides) | (8–15) |
| poly(methyl methacrylates) | (17) |
| cellulosics | (100–120) |
| polyolefins (PE, PP) | (100–150) |

Note:
Many other polymers (especially rubbers) have oxygen barrier values in the 1000's.

TABLE V

Ranking of Polymers As Carbon Dioxide Barriers
(cu cm/mil/100 sq in/day/atm at 73° F. and 0% RH)

*Excellent Carbon Dioxide Barriers*

| | |
|---|---|
| poly(vinyl alcohols) | (.3) |
| poly(vinylidene chlorides) | (.3) |
| cellophane | (.3) |
| poly(acrylonitriles) | (3.0) |

*Good Carbon Dioxide Barriers*

| | |
|---|---|
| poly(amides) e.g. nylons 6 and 66 | (9.0) |
| crystalline poly(chlorotrifluoroethylenes) | (12.) |
| poly(vinylidene fluorides) | (15.0) |
| poly(esters) e.g. PET and PBT | (12–20) |
| poly(amides) e.g. nylons 69, 6,10 and 6,12 | (12–20) |
| poly(vinyl chlorides) | (20–40) |

*Fair Carbon Dioxide Barriers*

| | | | |
|---|---|---|---|
| poly(olefins) | (300–400) | cellulosics | (300–400) |

Although insufficient permeation data apparently exist in the literature for the oxides of sulfur and nitrogen, which are believed to be potential problems in automotive applications, we may anticipate that good barriers to oxygen and carbon dioxide will also serve as good barriers for these other gases since their molecular size is similar. However, certain polymers may exhibit specific interactions with these gases and, therefore, further delay permeation in a manner analogous to water molecules becoming hydrogen bonded to polar groups.

For example, specific interactions are believed to occur between carbon dioxide and nitrile groups of polyacrylonitrile barrier films (*Encyclopedia of Polymer Science and Technology*, Vol. 12, 1970, p. 695.) Thus, it is believed that some polymers will exhibit adventitious interactions with gases such as the oxides of sulfur or nitrogen and thereby increase the lag time for their transport through the total barrier structure. Despite the complexities just described, it is possible to intelligently select preferred hydrophilic and hydrophobic polymers which will provide the needed combined moisture vapor and gas barrier properties.

In terms of the hydrophilic layer, high water absorption and low MVP (or WVTR) values are desirable. Although these two features may at first appear to be at odds, as noted earlier, the main feature of the multilayer barrier of this invention is to employ a sequence of materials that will significantly increase the lag time before steady state permeation can occur. This point is also critical to the selection of preferred gas barriers since, except for the "SARAN" type polymers, the superior gas barriers are also hydrophilic materials.

Hence, a set of presently preferred materials may be determined as we now describe. We assigned point values for the properties as noted in Tables I through V as follows:
Excellent: 10 points
Good: 7 points
Fair: 3 points Next, other important characteristics were also rated using an integer scale from 0 to 2 points depending on desirability for each of the following: cost, clarity, processability, bondability, abrasion resistance, and flexibility. Since the materials chosen in the Tables already represented a selected group for comparison, we considered those materials to be preferred which accumulated a score of at least 50% of the maximum number of points possible.

The results of the evaluation, shown in Table VI, are divided into two categories of preferred materials in accordance with the present invention, i.e. preferred hydrophilic layers and preferred hydrophobic layers, where all properties are assumed to be included, i.e. not just moisture related behavior as the names might imply. Although certain combinations of materials may be preferred, any combination of these materials may be considered a viable alternative for the practice of the invention as outlined above.

TABLE VI

Preferred MOISTURE and GAS Barriers
(Ranked within each category)

| | Total Points |
|---|---|
| A. Preferred Hydrophilic Polymer Layers | |
| poly(vinyl alcohols) | 58 |
| cellophane | 54 |
| poly(acrylonitriles) | 50 |
| poly(amides) i.e. nylon 6 and 66 | 41 |
| B. Preferred Hydrophobic Polymer Layers | |
| poly(vinylidene chlorides) | 58 |
| poly(esters) | 46 |
| poly(vinylidene fluorides) | 44 |
| poly(chlorotrifluoroethylenes) | 42 |
| poly(amides) i.e. nylon 6,10 and 6,12 | 41 |
| poly(vinyl chlorides) | 39 |
| poly(olefins) poly(ethylene), poly(propylene) | 34 |

All other polymers considered scored less than 31 out of 62 total possible points by the method used.

Selection of Layer Thicknesses

It is known to approximate the permeability of multilayer polymer barriers by using the following harmonic average:

$$(1/P_m) = \Sigma(W_i/P_i)$$

where $P_m$ is the net multilayer permeability for layers with weight fractions of each layer $W_i$ and permeabilities of each layer $P_i$. For example, one can calculate the effective moisture vapor permeability at equilibrium (ignoring the time lag effect) for the typical prior art barrier (ignoring the fact that the non-bonded interface may have some effect in practice). We now describe the calculation.

The PCTFE layer is 0.005 inch (0.13 mm) thick and the nylon layer is 0.003 inch (0.08 mm) thick. Their respective densities are 2.12 and 1.16 g/cc. The difficulty in practice is to estimate the proper value for the moisture vapor permeability for the particular materials at hand. Although Table III suggests a value of about 0.2 for PCTFE, experience shows that this is likely to be above the value for some commercially available PCTFE films. Thus, the use of 0.2 as the MVP value gives an optimistic estimate for the PCTFE/nylon 6 combination. The nylon 6 MVP is about 3.3.

Calculation of the weight average for the two components yields about 75.3% by weight PCTFE and 24.7% by weight of nylon 6. Substitution into the harmonic average equation yields a permeability for the 2-layer barrier as $P_m = 0.26$ for 1.0 mm of barrier thickness (see Table IV). As expected, the performance of the PCTFE layer is controlling.

For comparison, consider the case of the PVDF based lamp with a PVDF barrier film of equivalent thickness. The ratio of its MVP (0.7) to that of the 2-layer barrier (0.26) gives the factor by which a PCTFE (MVP=0.2) plus nylon 6 (MVP=3.3) is superior to the PVDF on a per mm basis. Since this ratio is only about 2.7 and since PCTFE based films can vary substantially as noted earlier, it is then not so surprising that we found about 0.005 to 0.010 inch of PVDF to equal the performance of one prior art lamp with low crystallinity PCTFE and about 0.020 to 0.025 inch PVDF film barrier equal in performance to another prior art lamp which uses a more crystalline PCTFE.

The following examples indicate the superiority of a combined moisture and gas barrier of the invention over that of an improved moisture barrier.

For the examples given below, it has been found convenient to use a relatively short term experiment to predict longer term performance since the electroluminescent lamp light emission varies with time as shown by the representative curves in FIG. 3. Thus, we have found that as little as 24 hours of environmental exposure is indicative of improvements over the prior art by use of the present invention.

Figure 3:
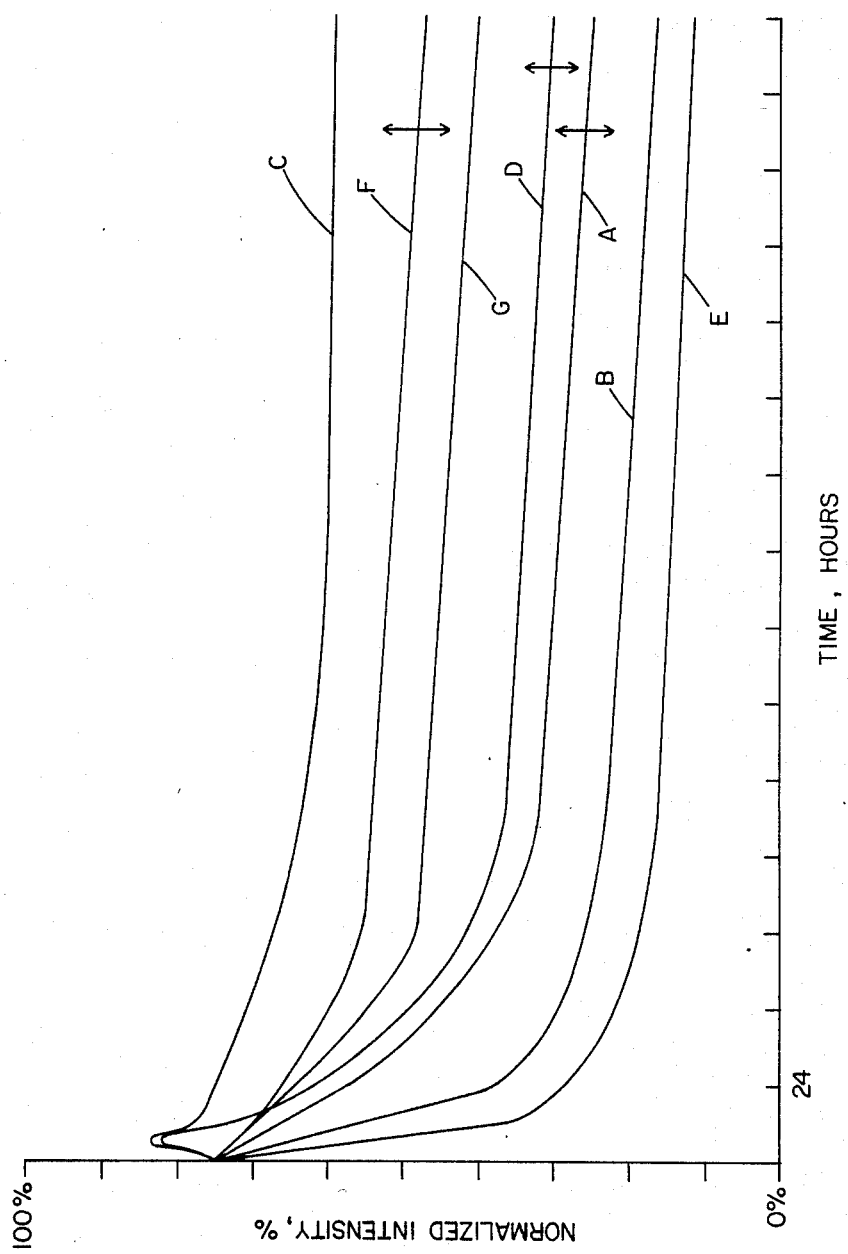
FIG. 3 is a representative graph of light intensity versus time for electroluminescent lamps made according to the invention and prior art lamps under different environments, as described.

Furthermore, the exact position of the "tail end" (or longer times) of the curves according to the instant invention can be varied at will by changing the composition of the multilayer barrier, both in types of materials and in amounts as noted in FIG. 3 by the arrows located on curves A, D and F for the examples of the present invention as compared to curves B, E and G for the prior art.

The pairs of curves in FIG. 3 are identified as follows: (1) A vs B for 100% relative humidity exposure at about 70° F. (21° C.); (2) D vs E for elevated temperature exposure at 160° F. (71° C.); and (3) F vs G for common ambient conditions fluctuating between about 40 and 60% relative humidity at about 70° F., the first letter in each case corresponding to the results obtained by application of the present invention. Curve C represents the approximate upper bound for commercial phosphors used in lamps, regardless of the barrier layer, when operated in an essentially moisture free environment, i.e. some intrinsic deterioration is superposed on environmental effects.

Although according to the prior art one could in principle also shift the "tail end" of those curves upward, in most cases this would be impractical because the thickness of the barrier layer cannot be increased without bound due to excessive decrease in the absolute value of the light intensity. Also, as clearly shown in the Tables used for the selection of the preferred materials according to this invention, the prior art materials are inferior as barriers for delaying the permeation of electrochemically active gases.

Furthermore, the prior art barriers are also inferior in regard to the ability to prolong the diffusion time lag effect before steady state permeation is established. It should be noted that steady state permeation may not necessarily correlate with the steady decline in light intensity at long times as seen in FIG. 3 since the actual electrochemical mechanism for the deterioration of phosphors has never been conclusively proven.

EXAMPLE 1

Tests were performed on two different types of commercial electroluminescent lamps and compared to lamps made according to this invention. All lamps were powered to 115 volts and 400 Hz in a controlled 100% relative humidity environment at a constant temperature of 70° F.

The barriers of commercial lamps A and B were fully encapsulated (0.125 inch (3.2 mm) wide edge seals on all sides) with a 0.005 inch (0.13 mm) outer layer of "ACLAR" (PCTFE) and a 0.003 inch (0.08 mm) nylon 6 layer (not a part of the edge seals) interposed between the outer barrier layer and the lamp body, but not integrally bonded to either.

In lamp A, the "ACLAR" layer was of high crystallinity (i.e. reduced transparency and readily stress cracked when flexed).

In lamp B, the "ACLAR" layer was of lower crystallinity (i.e. it had good transparency but did not readily stress crack when flexed).

Control lamps were made using the PVDF based lamp body as described above. Five sets of at least three such lamps were thermally bonded with transparent PVDF films of different, but increasing, thickness from 0.005 to 0.050 inch (0.13 to 1.7 mm).

Another series using the same type of PVDF base lamps were thermally bonded with only a 0.005 inch (0.13 mm) 3-layer structure consisting of 0.003 inch (0.08 mm) of hydrophobic linear low density polyethylene (LLDPE) bonded to (0.0005 inch) (0.013 mm) of hydrophilic, EVAL (poly(ethylene-vinyl alcohol) copolymer) bonded to a 0.0015 inch (0.04 mm) hydrophobic poly(ethylene terepththalate).

The percentages of initial brightness after 24 hours of environmental exposure as described above were found to be as shown in Table VII:

TABLE VII

Brightness Retention After 24 Hours On Exposure to 100% Relative Humidity at 70° F. While Operated at 115 Volts and 400 Hz.

| Lamp Description | Thickness of Barrier, ($10^{-3}$ inch) | % Initial Brightness |
|---|---|---|
| Prior art lamp A (2-layer Barrier; PCTFE/nylon 6) | 5 + 3 = 8 | 60.0* |
| Prior art lamp B (2-layer Barrier PCTFE/nylon 6) | 5 + 3 = 8 | 37.8 |
| PVDF based lamp 1-layer | | |
| Barrier PVDF only | 5 | 36.1 |
| Barrier PVDF only | 10 | 42.4 |
| Barrier PVDF only | 15 | 47.5 |
| Barrier PVDF only | 25 | 72.1 |
| Barrier PVDF only | 50 | 98.8 |
| Present invention (3-layer Barrier on a PVDF lamp LLDPE/EVOH/PET) | 3 + .5 + 1.5 = 5 | 51.6 |
| Present invention (5-layer Barrier on a PVDF lamp; LLDPE/EVOH/PET/EVOH/LLDPE) | 10 | 76.6 |

*High value due to high crystallinity grade PCTFE, but this material is not practical because it stress cracks easily and then deteriorates rapidly. Prior Art Lamp B contains PCTFE of lower crystallinity, which is much less likely to stress crack andis therefore more generally used in lamps of this type.

Clearly, the 0.005 inch, 3-layer structure, even though thinner, is superior to the 2-layer, 0.008 inch lamp B structure and superior to 0.015 inch PVDF single layer structure. Furthermore, these results are unexpected since it can be shown by calculation that the effective permeability of the 5 mil 3-layer structure should be higher than for the 0.008 2-layer structure of the prior art.

It was previously shown that the harmonic average MVP for the ACLAR/nylon 6 would be on the order of 0.26 while the MVP for PVDF is 0.7. Thus, since the MVP values are for the same thickness, the ratio of these values (2.69) can be equated to predicting that 0.0215 inch of PVDF are needed to be equivalent in moisture barrier to the prior art 2-layer structure. From the common control data for varying PVDF barrier layer thickness for prior art lamp A, we can confirm that crystalline PCTFE was used and that a less crystalline PCTFE was used for prior lamp B.

Again using the harmonic average method, for EVOH=EVAL E combined with PET and LLDPE, as shown in Table VII, yields a multilayer permeability ($P_m$) of 0.44. Thus, for the same barrier thickness, the 2-layer prior art lamp A should be 1.69 times more effective. The 3-layer structure was only 0.005 inch vs the 0.008 inch thickness of the 2-layer structure, which increases the multiplier to 2.7 times better for the same thickness.

Relative to the PVDF barrier or common control lamps, the 3-layer is equivalent to a PVDF barrier thickness of about 0.016 inch; and the 2-layer structure is equivalent to a Kynar barrier thickness of about the calculated 0.0215 inch. This ratio equals only 1.34, thus, only 1.34 of the 2.7 times difference can be accounted for on the basis of MVP alone and the remaining additional improvement over the predicted value must be due to other factors. One factor could be the postulated increase in the time lag effect while a second factor could be the postulated need for a gas barrier since the 3-layer structure can be shown to be far superior to both the 2-layer prior art structure and the PVDF 1-layer structure as a gas barrier.

Using the harmonic mean for calculating the oxygen permeabilities and assuming the best values for PCTFE and nylon 6 for the same thickness (even though the prior art 2-layer structure is 0.008 inch thick versus 0.0005 inch thick for the example of the present invention) the 3-layer structure provides 38.3 times the oxygen barrier of the prior art structure and 47.6 times the oxygen barrier of the PVDF structure, i.e. the PCTFE/nylon 6 structure is about the same as the PVDF and neither is seen to approach the performance of the 3-layer barrier structure, despite the difference in thickness.

EXAMPLE 2

In a similar manner, Table VII shows an example 5-layer barrier structure according to the present invention, representing one means for raising curve A relative to curve B in FIG. 3. Since the weight fractions are the same as for the 3-layer example, the harmonic average permeability per millimeter thickness is still the same, i.e. $P_m = 0.44$. Thus, the 0.008 inch thick 2-layer prior art structure should 1.352, or 35.2% better than the 5-layer barrier of the present invention, even after compensating for the greater thickness.

From the data of Table VII this does not appear to be the case, since the 5-layer, 0.010 inch thick barrier appears superior to the best prior art example by 16.6% above 60%. This discrepancy in favor of the barrier of the present invention suggests that factors other than moisture alone are important. The gas barrier properties of this the 5-layer barrier appear to be higher than the already superior gas barrier of the 3-layer barrier by a factor of about two, compared to the prior art as calculated in Example 1.

EXAMPLE 3

Although the 3-layer barrier thermally bonded to the PVDF-based lamp body without a special adhesive, the peel strength of the bond was marginal (bond strength of about 0.5 to 1 pli (pound per linear inch)). Normal handling of this which is not fully encapsulated by thermally bonded edge seals results in loss of light emission at the edges.

Figure 1:
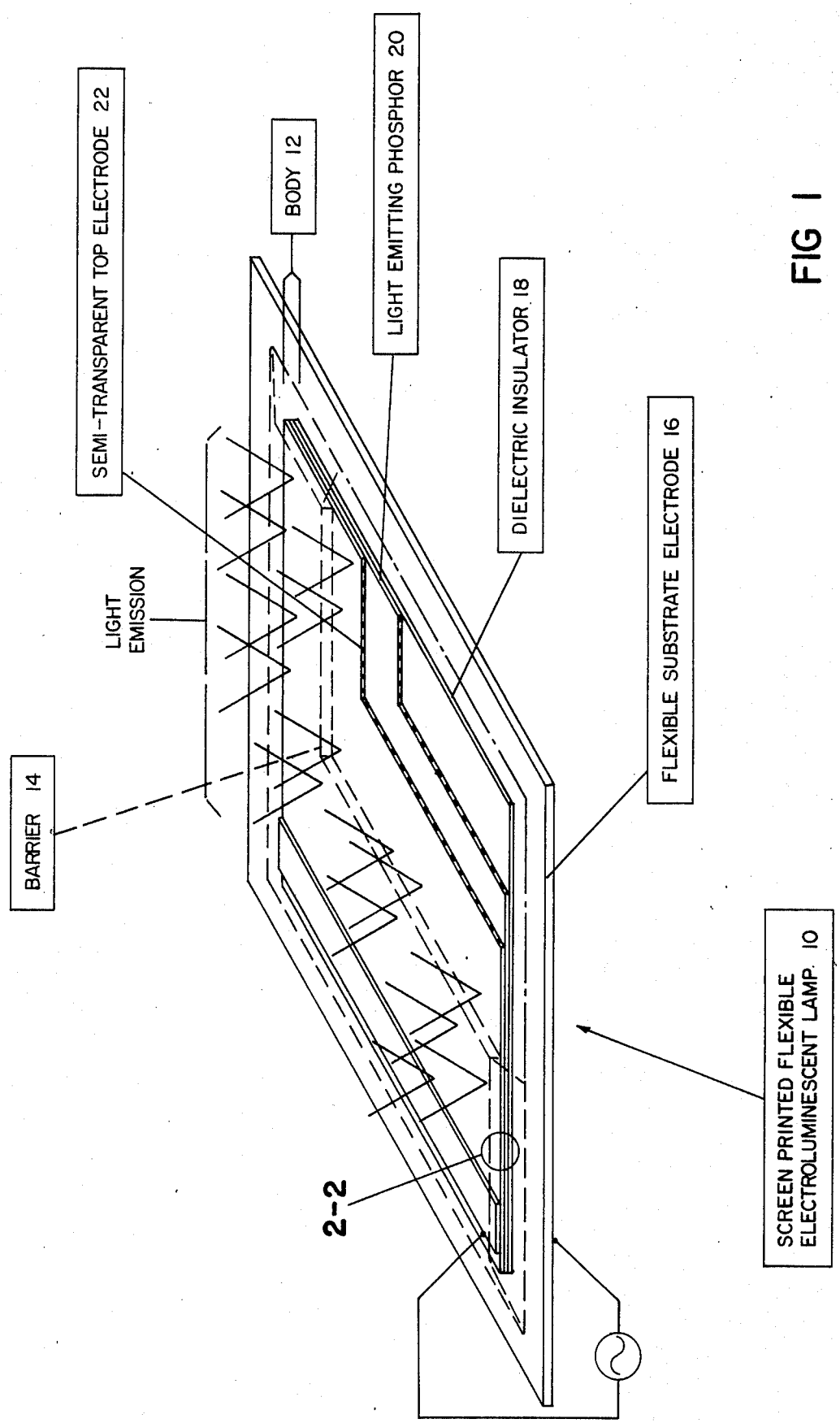
FIG. 1 is a perspective view in section of an example electroluminescent lamp with an outer multilayer cover film barrier according to the invention.

To improve the bond strength, an optional adhesive layer (24 FIG. 1) of a copolymer of ethylene and ethyl acrylate (EEA) was inserted, but the bond strength increase was insignificant. However, since it is known that PVDF and PMMA (poly(methyl methacrylate)) are totally miscible over the whole range of compositions, we anticipated that a blend of EEA and PMMA might make a better adhesive if these two materials were also melt miscible. A series of such compositions were melt mixed in a specially designed extruder and extruded into bonding films.

As result of the above experiments, a preferred range of such blend compositions for improving the binding of barrier multilayer films according to this invention was discovered. These preferred compositions are weight % ratios between 65/35 and 35/65 EEA/PMMA, the most preferred compositions lying between about 55/45 and 45/55 EEA/PMMA. Beyond the preferred limits, no improvement in bond strength was observed. Standard conditions of temperature, time and pressure were employed for thermal bonding.

EXAMPLE 4

A further improvement was made by dispersing into the adhesive various levels of green pigment (obtained from Drakenfeld, Div. of Ciba-Geigy Co.) from 0.5% to about 4.0% by weight of polymer. As stated, one purpose for such a pigment or dye is to preferentially absorb infrared light emissions from the electroluminescent lamp for providing night vision goggle compatability. However, other possible uses might include changing the color or contrast ratio for certain applications.

The colorants may be used in the optional adhesive layer in amounts generally less than about 10% by weight of polymer. Also, the other optional adhesive layers may contain the same or different colorants. The barrier properties of these adhesive layers (about 0.0005 inch thick) are insignificant compared to the other barrier materials in the 3-layer structure. Thus, on improving the adhesive bond strength to about 4 pli, we observed only a slight increase in brightness retention relative to the 3-layer structure without the adhesive containing the pigment, but the handling characteristics were significantly improved.

EXAMPLE 5

Exposure of samples of the prior art lamp A of Table VII to an elevated temperature of 160° F. (71° C.) while operated at ambient air humidity (about 40–60%) for 24 hours at 115 volts and 400 Hz gave a value of brightness retention or normalized light intensity of only 37%, a decrease compared to the value of 60% at 100% RH and 70° F.

A PVDF based lamp with a 3-layer barrier according to the present invention yielded a corresponding value of 90.5% brightness retention which is an improvement relative to the conditions of Table VII. Such behavior may perhaps be explained if it is assumed that permeation of electrochemically active gases is important since the 3-layer barrier is much superior to the PCTFE/nylon 6 in gas barrier properties. Furthermore, 71° C. is above the normal glass transition temperature of the PCTFE which will increase both its moisture and gas permeabilities and which may explain its large drop in performance at elevated temperatures.

EXAMPLE 6

The 3-layer barrier and the 1-layer, 0.005 inch thick PVDF barrier described in Example 1 were compared with a different 3-layer barrier according to this invention by testing at 50% RH and 70° F. while operating at 115 volts and 400 Hz. This second example of a multilayer barrier consisted of a 0.0002 inch thick SARAN (PVDC) coated on 0.001 thick cellophane bonded to 0.0005 inch thick PET bonded to the lamp by a polyolefin based adhesive which contributed little to the barrier properties relative to the other components.

Thus, a 0.0017 inch thick barirer layer according to this invention gave a brightness retention of 80% while the 0.005 inch thick, 3-layer LLDPE/EVOH/PET structure gave a 68.5% retention in light output. As a control, the 0.005 inch thick PVDF barrier film yielded a value of 60%.

By the harmonic average method, the MVP calculates to $P_m = 0.036$, which for the same thickness means that this combination should be 12.2 times better than the 3-layer structure. Adjusting for difference in thickness (0.0017 inch compared to 0.005 inch), this factor is reduced to 4.16 times. However, the gas barrier properties of this combination can be shown to be inferior to the 0.005 inch thick, 3-layer barrier.

For example, the oxygen permeability for the 0.005 inch thick 3-layer barrier of Table VII is 0.0945 while for the 0.0017 inch thick 3-layer structure, the value is 0.1705 for the same thickness, i.e. the latter is inferior to the former even before correcting for the thickness difference. Thus, the 0.005 inch thick 3-layer barrier should be better as an oxygen barrier by a factor of 5.3 times.

While the MVP properties are superior, the gas barrier properties are inferior, although not completely compensating. These results, i.e. only 11.5 percentage points increase caused by an apparent 4.16 times increase in moisture barrier, further support the postulate that both moisture and gas barrier properties are required for increasing the life of electroluminescent lamps.

It appears from the above examples that many different combinations of barrier layers made in accordance with the present invention can provide improvements over the prior art.

Other embodiments of the invention are within the following claims.

I claim:

1. In an electrolumiscent lamp having a lamp body comprising a phosphor-particle-containing layer disposed between corresponding upper and lower electrodes that are adapted to apply an excitation potential to said phosphor particles, the upper electrode being light transmissive to radiation from said particles, and having a transparent barrier comprising a multilayer film disposed over said lamp body,
   the improvement wherein,
   said barrier comprises an integral multilayer polymeric film,
   a first (innermost) layer of barrier material being disposed in face-to-face contact with the exposed outer surface of said lamp body and being integrally bonded thereto, the substance of said first (innermost) layer being hydrophobic, having a characteristic vapor transmission rate significantly below the vapor transmission rate of the substance of the contacting surface of said lamp body,
   a second layer of barrier material being disposed in integral face-to-face contact with the outer surface of said first barrier layer and bonded thereto, the substance of said second barrier layer being hydrophilic, having a vapor transmission rate significantly greater than the vapor transmission rate of the substance of said first barrier layer, said first barrier layer disposed between said lamp body and said second barrier layer, and
   a third layer of barrier material being disposed in integral face-to-face contact with the outer surface of said second barrier layer and bonded thereto, the substance of said third barrier layer being hydrophobic, having a vapor transmission rate significantly less than the vapor transmission rate of the substance of said second barrier,
   whereby the substances of said barrier layers are chosen to provide alternating zones of hydrophobic and hydrophilic character, the innermost barrier layer in contact with said lamp body being of hydrophobic character, with interfacial boundaries between said layers, to restrict and delay permeation of moisture through said barrier material into said lamp body, the effective retardation of vapor transmission through said barrier material into said lamp body being greater than the sum of the retardation characteristics of the substances of said individual barrier layers.

2. The electroluminescent lamp of claim 1 wherein the exposed outer surface of said third barrier layer of said barrier is the outer surface of said electroluminescent lamp, said lamp comprising said barrier disposed about said lamp body.

3. The electroluminescent lamp of claim 1 wherein said barrier material comprises an integral number of pairs of barrier layers disposed upon said first barrier layer, the substance of the inner layer of each said pair of layers having a characteristic vapor transmission rate greater than the vapor transmission rates of the material of the barrier layers disposed adjacent thereto, each of said barrier layers lying in integral, face-to-face contact with adjacent barrier layers and bonded thereto.

4. The electroluminescent lamp of claim 1, 2 or 3 wherein a hydrophilic layer of said barrier is a material selected from the group consisting of:
   poly(vinyl alcohols),
   cellophane,
   poly(acrylonitriles), or
   poly(amides), i.e., nylon 6 and 66.

5. The electroluminescent lamp of claim 1, 2 or 3 wherein hydrophobic layer of said barrier is a material selected from the group consisting of:
   poly(vinylidene chlorides),
   poly(esters),
   poly(vinylidene fluorides),
   poly(chlorotrifluoroethylenes),
   poly(amides) i.e. nylon 6,10 and 6,12,
   poly(vinyl chlorides), or
   poly(olefins), i.e., poly(ethylene), and
   poly(propylene).

6. The electroluminescent lamp of claim 1 wherein said barrier material is preformed by coextrusion.

7. The electroluminescent lamp of claim 1 wherein said barrier material is preformed by lamination.

8. The electroluminescent lamp of claim 7 wherein interfacial bonding between two or more layers is provided by means of adhesive.

9. The electroluminescent lamp of claim 1 wherein at least one said hydrophilic barrier layer when disposed upon said lamp has moisture content below its characteristic level of saturation, whereby the rate of vapor permeation through said barrier into said lamp is further retarded.

10. The electroluminescent lamp of claim 1 wherein a barrier layer of hydrophilic character has the additional characteristic of retarding permeation of atmospheric gas therethrough into said lamp.

11. The elctroluminescent lamp of claim 1 or 10 wherein the substance of said barrier layer of hydrophilic character is ethylene vinyl alcohol (EVOH).

12. The electroluminescent lamp of claim 1 wherein the substance of the third barrier layer is polyethylene terephthalate (polyester).

* * * * *

UNITED STATES PATENT AND TRADEMARK OFFICE
CERTIFICATE OF CORRECTION

PATENT NO. : 4,687,968
DATED : August 18, 1987
INVENTOR(S) : Paul D. Frayer

It is certified that error appears in the above-identified patent and that said Letters Patent is hereby corrected as shown below:

Column 12, line 25, under Table VII, "andis" should read -- and is --.

Signed and Sealed this

Fifth Day of January, 1988

Attest:

DONALD J. QUIGG

Attesting Officer

Commissioner of Patents and Trademarks